United States Patent [19]
Marek

[11] Patent Number: 5,371,454
[45] Date of Patent: Dec. 6, 1994

[54] PASSIVE BATTERY CHARGING SYSTEM

[76] Inventor: Albert Marek, 705 Bradley Cir., Grand Prairie, Tex. 75051

[21] Appl. No.: 27,406

[22] Filed: Mar. 8, 1993

[51] Int. Cl.$^5$ .................................................. H02J 7/10
[52] U.S. Cl. .......................................... 320/15; 320/2; 320/57
[58] Field of Search ........................... 320/15, 17, 57, 2

[56] References Cited

U.S. PATENT DOCUMENTS

| | | | |
|---|---|---|---|
| 3,579,075 | 5/1971 | Floyd | 320/2 |
| 4,092,580 | 5/1978 | Prinze | 320/2 |
| 4,575,670 | 3/1986 | Hignutt | 320/17 X |
| 4,831,321 | 5/1989 | Cooper | 320/2 X |

OTHER PUBLICATIONS

"Dual Pro Charger", Charging Systems International, Advertising Letter and flossy flyer Jan., 1991.
"Keep Car and Boat Batteries Charged When Not in Use—Safety", Herrington Catalog, Valentine Ed., p. 17. 1993.

*Primary Examiner*—Robert J. Hickey
*Attorney, Agent, or Firm*—Michael A. O'Neil

[57] ABSTRACT

A battery charger for simultaneously slow charging and thereafter maintaining a charge in a plurality of plate-type batteries includes a first transformer connected through a circuit loop to a first battery wherein the circuit loop includes a rectifier, and a current limiter and visual indicator of the charge level of the battery. A second transformer is connected through another circuit loop to one battery and through a third circuit loop to a second battery. The circuit loop of the first transformer may be connected to a first battery with one of the circuit loops of the second transformer being connected to a second battery connected in series to the first battery thus allowing the two loops to remain isolated from each other and allow for charging of the series connected batteries without removal of the series connection. In a second embodiment of the invention, a switch is connected in the loop to bypass the current limiter to allow a fast charge condition. A small indicator light is connected to the switch to indicate a fast charge condition. Thus, the charger may be switched from a slow passive charge condition to a fast charge condition, and back to a slow charge condition.

14 Claims, 5 Drawing Sheets

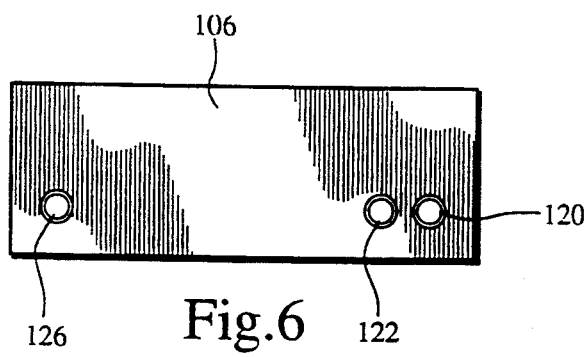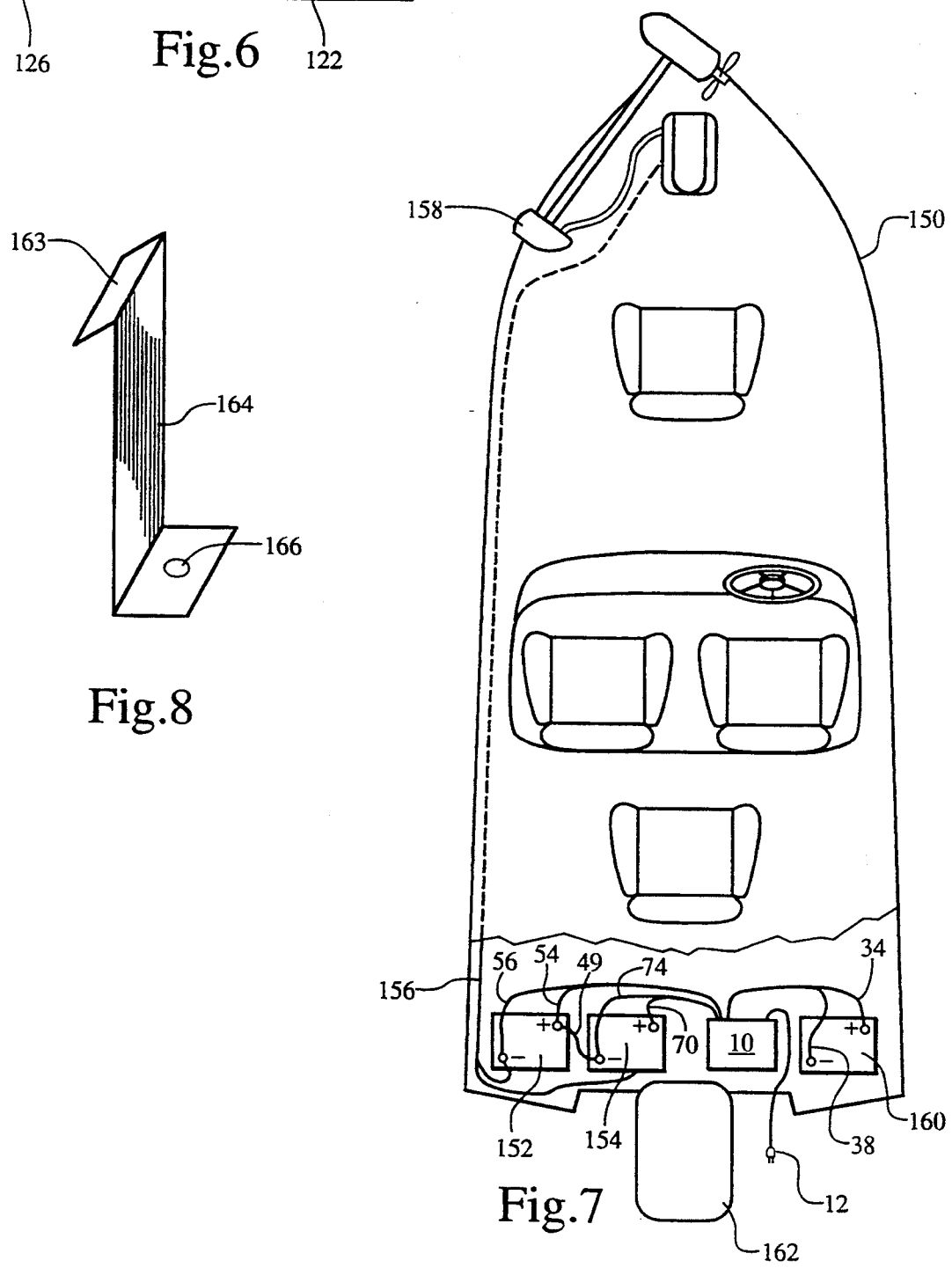

PASSIVE BATTERY CHARGING SYSTEM

TECHNICAL FIELD

This invention relates to battery chargers, and in particular, to a system for charging and maintaining charge in an infrequently used battery.

BACKGROUND OF THE INVENTION

Batteries in seasonal vehicles such as boats, farm equipment, RVs, in some military equipment, antique cars, and other vehicles used infrequently or only seasonally tend to lose their charge, requiring recharging at various use intervals. Conventional fast battery chargers are large and cumbersome, use a substantial amount of electricity, and charge at a faster rate than the battery can accept. When being charged with a conventional fast charger, the voltage and amperage of the battery will typically rise at a faster rate than the battery potential. Thus, when the voltage and amperage reach a level indicating that the battery is fully charged, the battery charger will be disconnected or turned off. The battery will then begin to equalize the voltage, amperage and potential, with the voltage and amperage levels dropping and the potential increasing until equalization is reached. Because of the variation in the voltage, amperage, and potential levels at the time full charge is indicated, the battery will actually be charged to only about 80% of its capacity following equalization. Thus, the prior art fast chargers cannot charge a battery to 100% of its capacity.

Batteries repeatedly charged in this fashion reduces the capacity of the battery such that the battery will begin to lose the ability to accept a full 100% charge of the original capacity. Additionally, the use of a fast battery charger often causes rapid expansion of the battery fluid and the generation of gases, thus requiring the removal of the battery caps while charging the battery. Failure to remove the caps may result in explosion of the caps causing damage or total destruction of the battery. Thus, marine, recreational vehicle, and other infrequently used batteries are protected under substantially shorter warranty periods, often less than one-half the length of the warranty periods for regularly used batteries, such as car batteries.

Trickle chargers, another conventional type battery charger, are slow battery chargers, charging the battery with only one-to-three amps of charge at a time. A slow charge will bring the battery to full charge and alleviates having to remove the battery caps while charging. However, if left on the battery for an extended length of time after the battery has obtained full charge, the trickle charger will damage the battery and may destroy it completely.

Due to the slow rate at which the trickle charger charges the battery, the charger must be connected to the battery a substantial period of time prior to the use of the boat or vehicle, prohibiting spontaneous use thereof.

In one attempt to overcome the foregoing problems, fast and slow battery chargers were designed to include built in features for automatic turn off of the charger once the voltage of the battery indicated a full charge. In such chargers, once the voltage drops to a predetermined level, the charger is automatically turned back on to again recharge the battery until the voltage reaches the full charge level. Although the battery is automatically recharged, this cycling process reduces the life of the battery. Depending upon the cycling range of the particular charger, the user may decide to use the vehicle at a point where the voltage of the battery has dropped to a level where the charger is about to begin recharging the battery.

Many fishing boats have a driving battery and two 12-volt batteries connected as a 24-volt power source for operation of a trolling motor. Thus, three chargers were required for charging each of the three batteries simultaneously.

SUMMARY OF THE INVENTION

The passive battery charger of the present invention overcomes the foregoing and other problems associated with prior art battery chargers by utilizing a continuous slow charge process, along with the capability of charging multiple batteries at the same time. A first embodiment battery charger includes at least two 12-volt transformers each connected in a circuit to at least one positive and one negative battery cable or terminal, with a light bulb connected in the circuit to regulate the amperage of the charging current flowing from the transformer to the battery. The light bulb further visually indicates the status of the charge on the battery in that the brightness of the light is inversely proportional to the battery charge. The circuit is further configured to prevent sparks when the charger is hooked up to the battery in reverse position or when the cables accidentally come into contact with one another. When the cables are connected in reverse position to the battery, the light bulb in the circuit is brightly illuminated. On the other hand, the bulb is dimly illuminated when the cables are properly connected to the battery.

The flow of current in the circuit from the transformer is reduced as the resistance of the battery increases with the increased charge. As the battery reaches a full charge, the resistance of the battery is balanced with a maximum output of the transformer. The light bulb in the circuit line regulates the amperage of current flowing from the transformer to the battery as it is charged. The light bulb further allows for the back down of current produced by the transformer as a result of the increased resistance from the battery during charging. Thus, the charger may remain continuously connected to the battery without reducing the life of the battery through cycling or overcharging, and without damage to the transformer. Due to the low amperage charging process, the battery charger uses very little electricity, resulting in very low operational costs.

In fishing boats wherein the trolling motor is powered by two 12-volt batteries connected in series to provide 24-volts, the battery charger of the present invention allows each 12-volt battery in the 12/24-volt configuration to be charged at the same time without removing the series connection between the two batteries. By providing at least two transformers, there is capacity for charging the driving battery for the boat at the same time as the trolling batteries. One transformer is connected through a split circuit to two sets of battery cables. The set of cables is connected to the driving battery with the second set of cables connected to one of the 12-volt trolling batteries. The remaining 12-volt trolling battery is connected to the cables from the second transformer. Thus, the circuits for charging the series connected batteries are isolated from one another to allow charging operations without requiring removal of the series connection.

In the event a battery must be charged in a relatively short period of time, in a second embodiment of the invention, a manual switch is connected to bypass the light bulb in the circuit, thereby allowing the flow of higher voltage and amperage to the battery for a fast charge. An indicator light is connected to the switch to indicate a fast charge condition. When the switch is in the off position, the passive slow charge condition resumes to maintain charge. Thus, in addition to the low operational costs and the continuous low amperage multiple battery charging capabilities, the charger may be converted to a fast charge device for charging of the battery in a few hours.

BRIEF DESCRIPTION OF THE DRAWINGS

For a more complete understanding of the present invention and the advantages thereof, reference is now made to the following Detailed Description taken in conjunction with the accompanying Drawings in which:

FIG. 6 is a rear view of the housing of FIG. 1;

FIG. 7 is a top view of a boat, illustrating the positioning of and the charging of the trolling motor and driving motor batteries;

FIG. 8 is an obtuse view of a mounting bracket for mounting the battery charger to a receiving surface;

DETAILED DESCRIPTION

Figure 1:
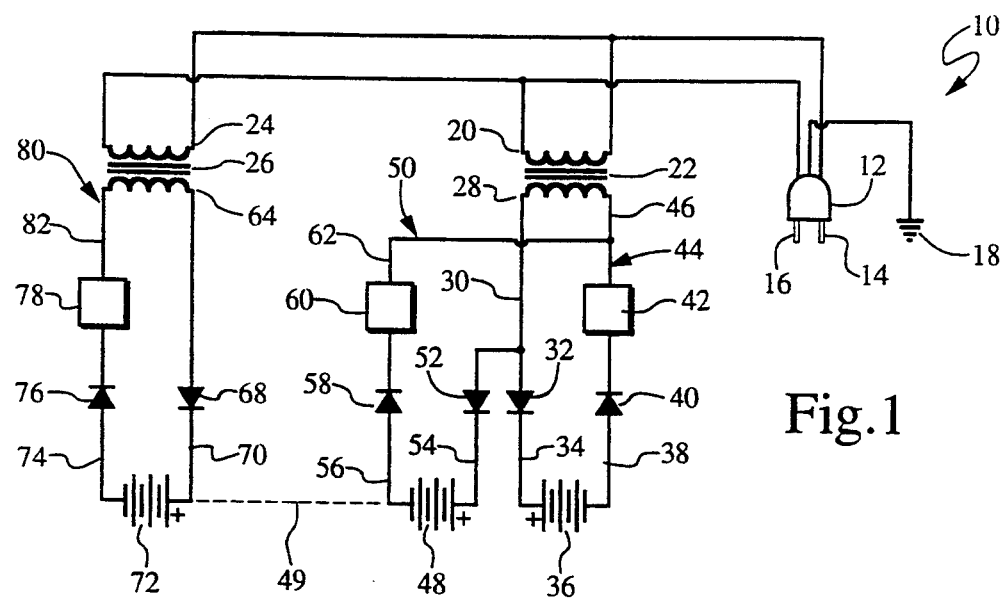
FIG. 1 is an electrical schematic of a battery charger incorporating a first embodiment passive battery charger of the present invention.

Referring now to the Drawings and more particularly to FIG. 1 thereof, there is shown a schematic diagram of the electrical circuit of a battery charger 10 incorporating a first embodiment passive battery charger of the present invention for charging 12-volt, acid or jell, regular or deep, cycle batteries. As illustrated in FIG. 1, the battery charger 10 is equipped with a conventional AC plug 12 insertable into a 120-volt AC receptacle and having opposite prongs 14 and 16 and a ground prong 18. The opposite AC prongs 14 and 16 are connected to the opposite ends of the primary coil 20 of a first transformer 22, and to the opposite ends of the primary coil 24 of a second transformer 26. The first transformer 22 is preferably a conventional 12-volt/3 amp transformer. The top of the secondary coil 28 of first transformer 22 is connected through line 30 to the anode of rectifier diode 32, the cathode of which is connected to a battery cable 34, in turn selectively connected at its distal end to the positive post of a 12-volt battery 36. The negative post of battery 36 is selectively connected through a battery cable 38 to the anode of rectifier diode 40, the cathode of which is connected to a one and one-half amp light bulb 42, which functions as a current limiter in the circuit 44. Although in the preferred embodiment of the invention the current in the circuit is limited by the one and one-half amp light bulb, other conventional current limiters may be used in place thereof. To complete the circuit, light bulb 42 is connected through line 46 to the bottom of secondary coil 28.

When charging a second battery 48, the current from transformer 22 is split between the first circuit 44 and a second circuit 50. The top side of the secondary coil 28 is connected through line 30 to the anode of diode 52, the cathode end of which being selectively connected to the positive post of the battery 48 through a battery cable 54. The negative post of the battery 48 is selectively connected through a battery cable 56 to the anode of a diode 58, the cathode end of which is connected to a second one and one-half amp light bulb 60, functioning as a current limiter for the second circuit 50. To complete the circuit 50, the light bulb 60 is connected to the bottom of the secondary coil 28 of first transformer 22 through lines 62 and 46.

As further illustrated in FIG. 1, the second transformer 26 is a conventional 12-volt/1.5 amp transformer, having a primary coil 24 and a secondary coil 64. The top of secondary coil 64 is connected through line 66 to the anode of a diode 68, with the cathode end selectively connected through battery cable 70 to the positive post of a third 12-volt battery 72, which may be a single battery or may be tied in series to battery 48 as illustrated by dotted line 49 to provide a 24-volt battery. The negative post of the battery 72 is selectively connected through battery cable 74 to the anode of a diode 76, the cathode end of which is connected to a third one and one-half amp light bulb 78, thereby limiting the current flowing through the circuit 80 to the battery 72 to a maximum of one and one-half amps. To complete the circuit 80, the light bulb 78 is connected through line 82 to the bottom of the secondary coil 64 of the transformer 26. When charging a single battery or three separate batteries, any one or combination of the circuits 44, 50, or 80 may be used.

Figure 2:
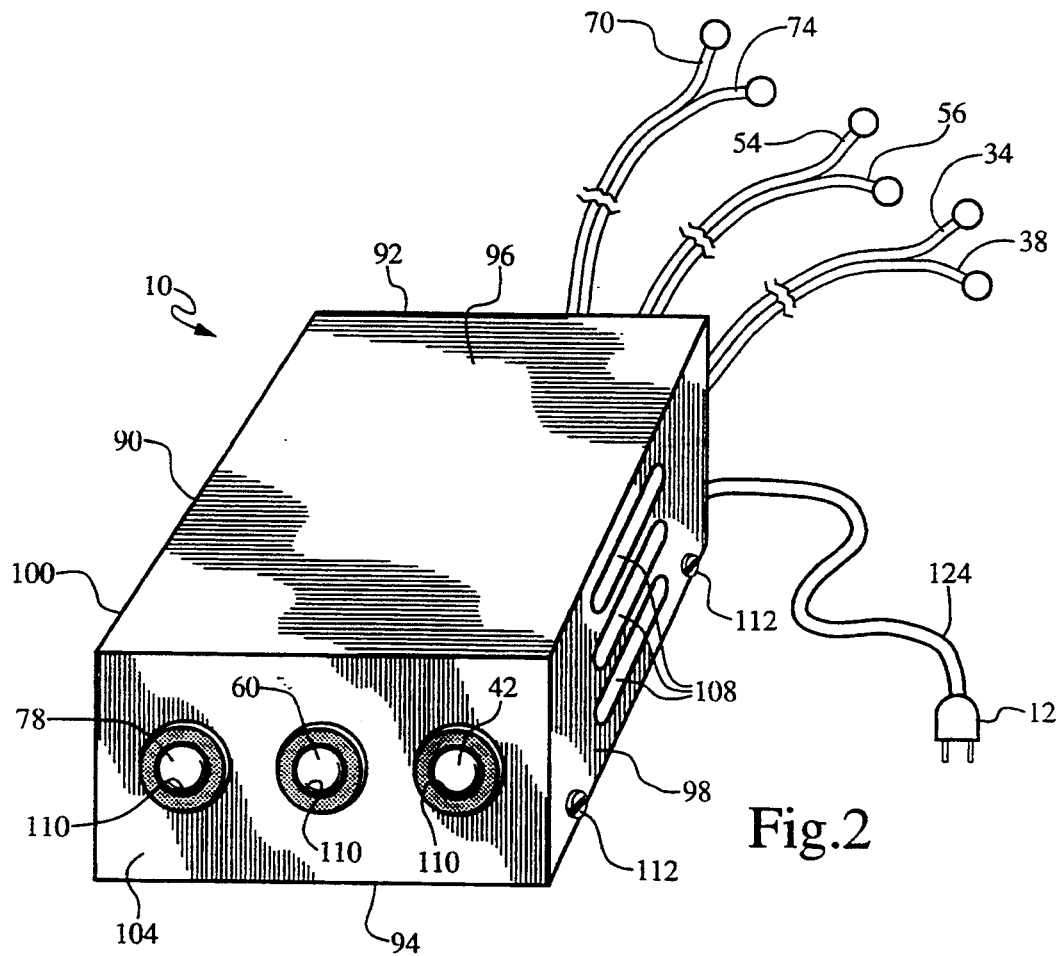
FIG. 2 is a drawing showing an obtuse view of the housing, and cables of the battery charger of FIG. 1.
Figure 3:
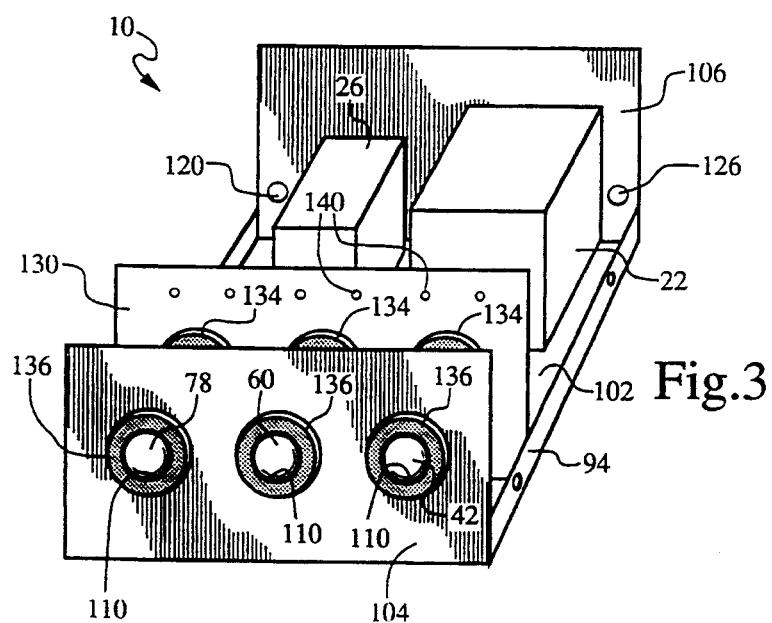
FIG. 3 is a drawing similar to FIG. 2 with the top half of the housing removed to show the interior of the battery charger of FIG. 1.
Figure 4:
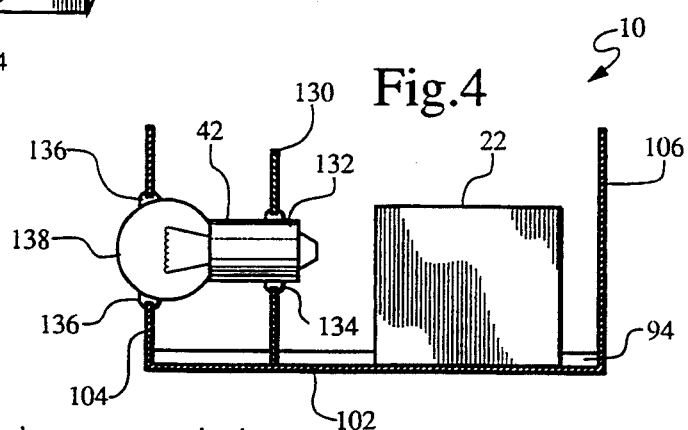
FIG. 4 is a side view of the battery charger of FIG. 3.

Referring now to FIGS. 2, 3, and 4, the transformers 22 and 26 along with the components of circuits 44, 50 and 80 are mounted within a housing 90, having a first half 92 and second half 94. The first half 92 defines a top 96, a first side 98, and a second side 100. The second half forms a bottom 102, a third side 104, and a fourth side 106. In the first and second sides 98 and 100, respectively, are vents 108 to allow air circulation through the battery charger 10. In the third side 104 are windows 110 for observing the illumination of the light bulbs 42, 60, and 78. The first half 92 of the housing is attached to the second half 94 of the housing using conventional fasteners 112.

Referring now to FIGS. 2, 3, and 6, battery cables 70 and 74 from circuit 80 and battery cables 54 and 56 from circuit 50 exit the housing 90 through opening 120 in the fourth side 106 of the housing 90. Battery cables 70 and 74 are paired with battery cables 54 and 56 to facilitate connection of the two pairs of cables to a pair of 12-volt batteries cross-connected for generation of 24-volts. Battery cables 34 and 38 from circuit 44 pass through opening 122 in the fourth side 106 of the housing 90. The cord 124 for the conventional AC plug 12 exits the housing 90 through an opening 126 in the fourth side 106 of the housing 90.

Referring now to FIGS. 3 and 4, the light bulbs 42, 60, and 78, are mounted in a circuit board 130 extending parallel to the third side 104 of the housing 90. The base 132 of each of the bulbs 42, 60 and 78, is secured in the circuit board 130 with a rubber grommet 134. Each of the windows 110 in the third side 104 of the housing 90 has a rubber grommet 136 positioned therein for contacting the lamp 138 of each of the bulbs 42, 60, and 78.

Figure 5:
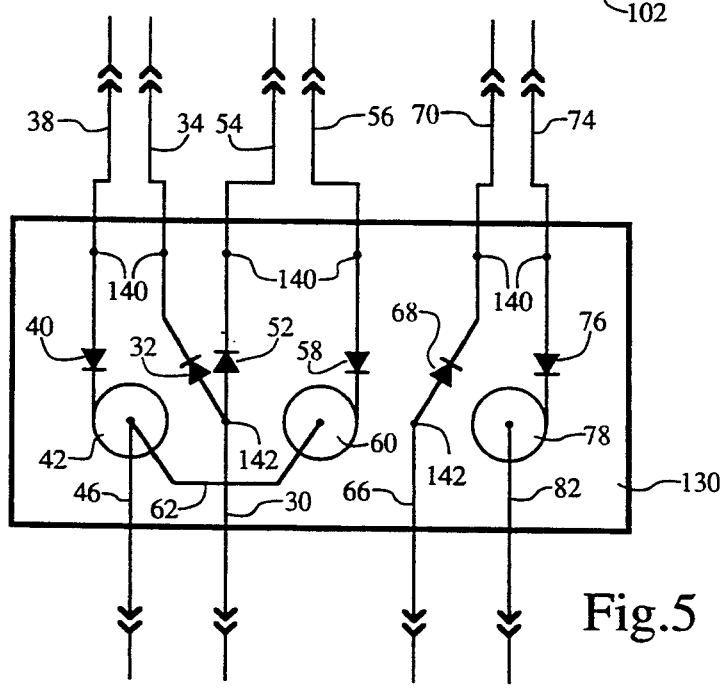
FIG. 5 is a drawing of the circuit board showing the wiring connections for the battery charger of FIG. 1.

As illustrated in FIG. 5, in addition to supporting the base 132 of each of the light bulbs 42, 60, and 78, the circuit board 130 provides the surface through which the connections 140 between the diodes 32, 40, 52, 58, 68, and 76 and the battery cables 34, 38, 54, 56, 70, and 74, respectively, and the connections 142 between the diodes 32, 52, and 68 and the lines 30 and 66 from the transformers 22 and 26.

When charging a battery using the charger 10 of the present invention, the current limiting light bulb 42 in each circuit 44, for example, limits the current delivered to the battery 36 to a maximum of 1.5 amps, that being the maximum amps the bulb 42 is capable of pulling. As the charge on the battery 36 increases, the voltage and amperage delivered by the transformer 22 are repelled by the increasing charge on the battery 36, thereby reducing the amps of the current passing through the bulb 42. Thus, as the charge on the battery 36 approaches 100% and the amps flowing through the bulb decrease, the illumination of the bulb 42 dims, thereby providing a visual indication at all times of the charge on the battery.

The light bulb 42 prevents damage to the battery 36 or transformer 22 by limiting the current flow to 1.5 amps in the event of a reversed polarity attachment of the cables 34 and 38 to the battery 36, in which case the bulb 42 is brightly illuminated. Similarly, the light bulb in each of the circuits 44 and 50 limits the current through each circuit, such that a short in any one of the circuits or the connection of a dead battery to any one of the circuits will not interfere with the current flowing through the remaining circuit. The configuration of the circuits 44, 50, and 80 further prevents sparking when connecting the cables 34 and 38, 54 and 56, and 70 and 74 to the batteries 36, 48, and 72, respectively.

In the event batteries 48 and 72 are connected in series as shown at 49 for generation of 24-volts, the isolation of circuits 50 and 80 from one another allows batteries 48 and 72 to be charged simultaneously without removing the series connection 49. Pairing of the cables 54 and 56 of circuit 50 and the cables 70 and 74 of the circuit 80 as they exit the housing 90 facilitates proper connection to the paired batteries 48 and 72. The passing of cables 34 and 38 through a separate opening in the housing 90 reduces the possibility of connecting both sets of cables receiving power from a single transformer 22 to the paired batteries 48 and 72, thereby facilitating the isolation of the circuits charging the paired batteries 48 and 72. By splitting circuits 50 and 44 from a single transformer 22, the passive charger 10 is kept small and relatively light weight.

Referring now to FIG. 7, there is shown a top view of a fishing boat 150. Most fishing boats 150 are equipped with two 12-volt batteries 152 and 154, to provide the power through a line 156 for driving a trolling motor 158, as well as a 12-volt battery 160 for providing the power for starting the gas engine 162 of the boat 150. The batteries 152, 154, and 160 are typically positioned as illustrated in FIG. 7, although any number of configurations may exist due to the design of the particular boat 150. Battery cables 34 and 38 of the battery charger 10 are connected to the driving battery 160. Cables 70 and 74 are connected to either trolling battery 154, or 152 and cables 54 and 56 connected to the remaining trolling battery. There is also a series connection 49 between batteries 152 and 154. For convenience, the passive battery charger 10 may be permanently mounted in the boat 150 using two of the mounting brackets 164 as shown in FIG. 8, and remain continuously connected to batteries 152, 154, and 160, at all times. A flange 163 of each bracket 164 is inserted into the lower vent slot 230 of sides 218 and 220 of the housing 90 and is attached to the receiving surface of the boat 150 with conventional fasteners by placing the fasteners through an opening 166 in each bracket 164.

Figure 9:
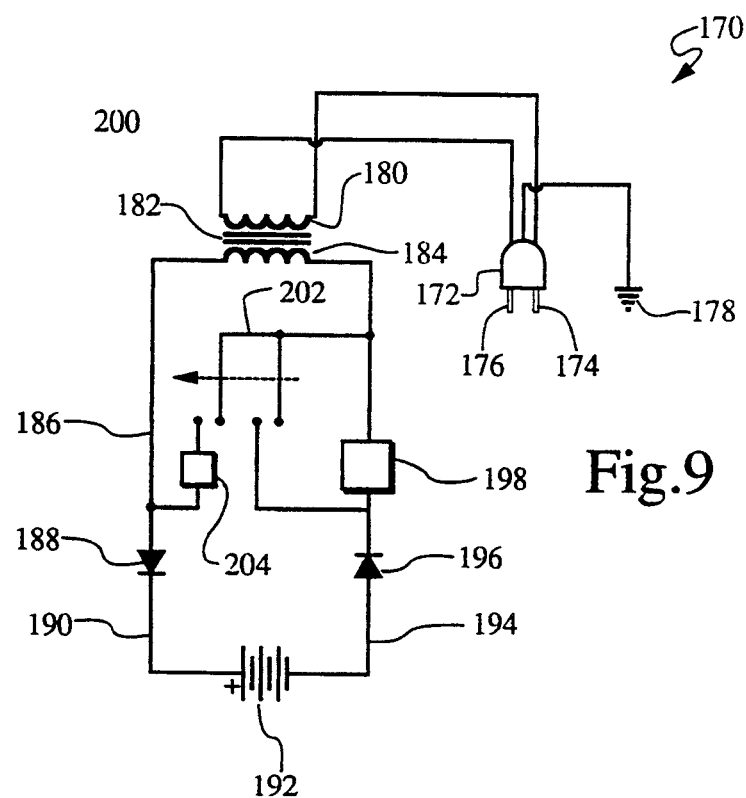
FIG. 9 is a schematic circuit diagram for a battery charger incorporating a second embodiment of the present invention.

Referring now to FIG. 9, there is shown a battery charger 170 incorporating a second embodiment of the passive battery charger of the present invention. As illustrated in FIG. 9, the battery charger 170 is equipped with a conventional AC plug 172 insertable into a 120-volt AC receptacle, with opposite prongs 174 and 176 and a ground prong 178. The opposite AC prongs 174 and 176 are connected to the opposite ends of the primary coil 180 of a transformer 182, having a secondary coil 184. The top of the secondary coil 184 is connected through line 186 to the anode of a rectifier diode 188, the cathode of which is selectively connected through a battery cable 190 to the positive post of a 12-volt battery 192. The negative post of the battery 192 is selectively connected through a battery cable 194 to the anode of a diode 196, the cathode end of which is connected to a 1.5 amp light bulb 198, functioning as a current limiter for the circuit 200. The passive battery charger 170 operates in the same way as previously described with respect to the circuits 44, 50, or 80 of the first embodiment passive battery charger 10. The battery charger 170 is, however, capable of producing a fast charge through the use of a double pole, double throw, switch 202 which functions to bypass the current limiting bulb 198. When in the closed position, the switch 202 creates a loop in the circuit bypassing the bulb 198, and closes the circuit such that a small indicator light 204 connected between the switch and line 186 is illuminated to indicate that the battery charger 170 is operating in a fast charge condition. It is understood that although the switch 202 is shown connected to a single circuit 200 in the charger 170, the switch may be connected to multiple circuits, such as those of the first embodiment battery charger 10. Likewise, each of the circuits of the first embodiment battery charger 10 may be separately equipped with switches 202 such that any one or more of the driving motor battery or trolling motor battery may simultaneously receive a slow charge while the remaining battery or batteries receive a fast charge from a single charging unit 10.

Figure 10:
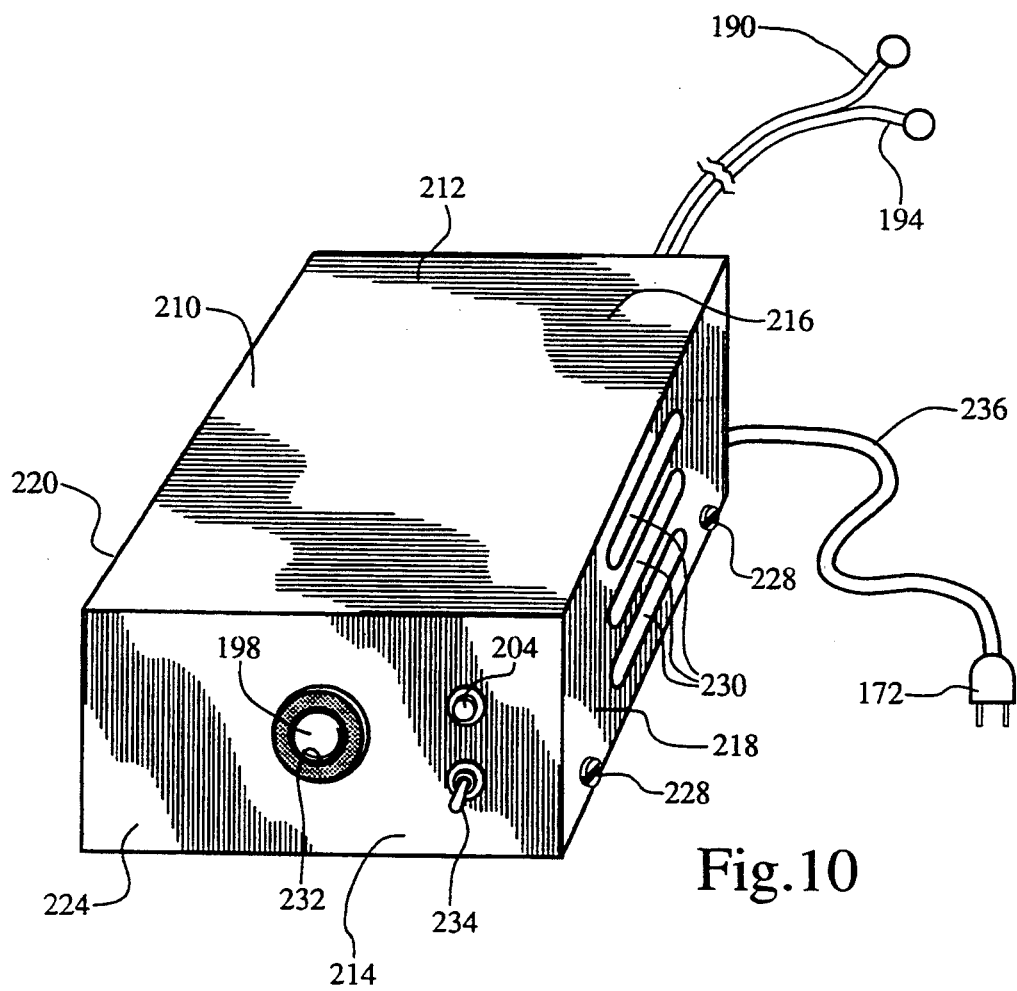
FIG. 10 is an obtuse view of the housing of the battery charger of FIG. 9.
Figure 11:
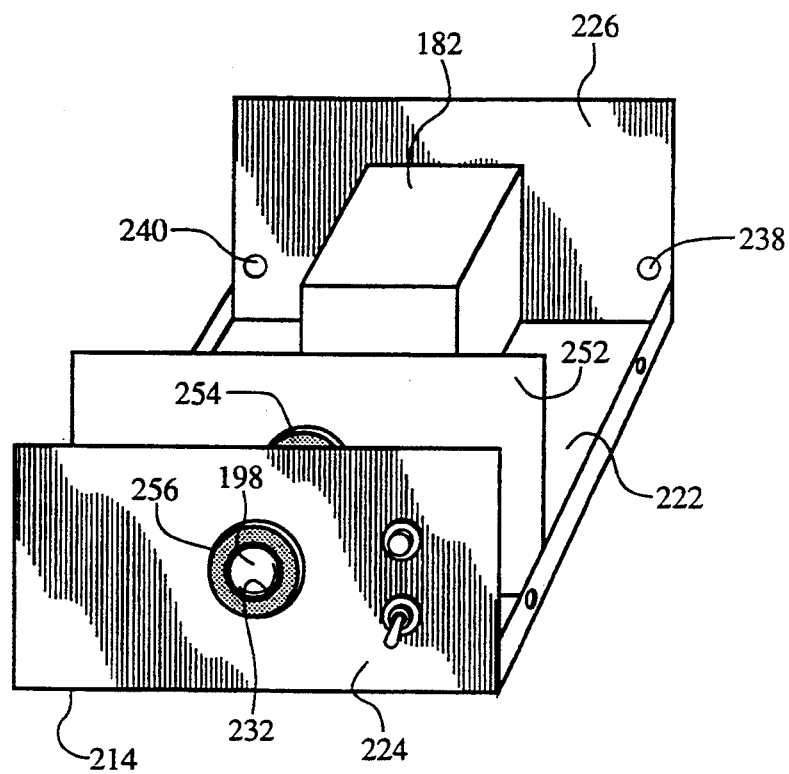
FIG. 11 is a view similar to FIG. 10 with the top of the housing removed to show the interior of the battery charger of FIG. 9.
Figure 12:
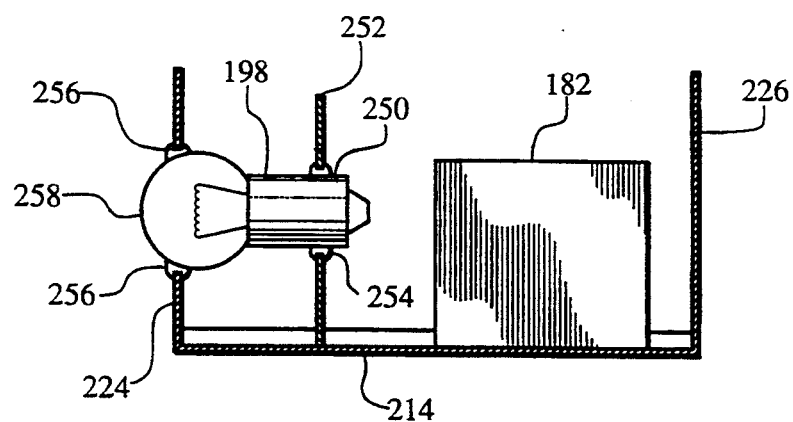
FIG. 12 is a side view of the battery charger of FIG. 11.

Referring now to FIGS. 10, 11, and 12, the transformer 182 is mounted within a housing 210 having a first half 212 and a second half 214. The first half 212 forms a top 216, a first side 218, and a second side 220. The second half forms a bottom 222, a third side 224, and a fourth side 226. The first half 212 is connected to the second half 214 with conventional fasteners 228 along the first side 218 and second side 220. The first side 218 and second side 220 have vents 230 therein to allow circulation of air through the charger 170. A window 232 in the third side 224 allows the illumination of the bulb 198 to be observed there through. Mounted on the third side 224 of the housing 210 is a lever 234 for actuating the switch 202. Also mounted on the third side 224 of the housing 210 is the small indicator light 204 for indicating a fast charge condition when illuminated. The cord 236 of the conventional AC plug 172 exits the housing 210 through an opening 238 in the fourth side 226. A second opening 240 in the side 226 provides an exit for the battery cables 190 and 194 from the housing 210.

Referring now to FIGS. 11 and 12, the base 250 of the bulb 198 is mounted in a circuit board 252 and secured therein by a rubber grommet 254. The circuit board 252 extends parallel to the third side 224. A second grommet 256 is placed within the window 232 for contacting the lamp 258 of the bulb 198.

I claim:

1. Apparatus for simultaneous passive charging and thereafter maintaining of charge in a plurality of plate-type batteries, each having a known theoretical voltage, a positive terminal, and a negative terminal, comprising:
    a first power supply having an alternating current output;
    a first rectifier diode having an input electrically connected to said output of the first power supply and having an output electrically connected to the positive terminal of a first battery to be charged;
    a second rectifier diode having an input electrically connected to the negative terminal of the first battery and an output;
    first current limiting means having an input electrically connected to the output of the second rectifier diode and having an output electrically connected to the first power supply;
    a second power supply having an alternating current output;
    a third rectifier diode having an input electrically connected to said output of the second power supply and having an output electrically connected to the positive terminal of a second battery to be charged;
    a fourth rectifier diode having an input electrically connected to the negative terminal of the second battery and an output;
    second current limiting means having an input electrically connected to the output of the fourth rectifier diode and having an output electrically connected to the second power supply;
    a fifth rectifier diode having an input electrically connected to said output of the second power supply and having an output electrically connected to the positive terminal of a third battery to be charged;
    a sixth rectifier diode having an input electrically connected to the negative terminal of the third battery and an output; and
    third current limiting means having an input electrically connected to the output of the sixth rectifier diode and having an output electrically connected to the second power supply.

2. The battery charging apparatus of claim 1, wherein the first alternating current power supply comprises a transformer capable of emitting a flow of electricity having a maximum voltage substantially equal to the theoretical voltage of the battery to be charged and a maximum amperage substantially equal to the maximum amperage of the first current limiting means.

3. The battery charging apparatus of claim 1, wherein the second alternating current power supply comprises a transformer capable of emitting a flow of electricity having a voltage substantially equal to the theoretical voltage of the battery to be charged and an amperage substantially equal to two times the maximum amperage of either the second or the third current limiting means.

4. The battery charging apparatus of claim 1, wherein each current limiting means further comprises a light bulb having a predetermined maximum amperage substantially equal to the maximum desired amperage for charging the connected battery.

5. The battery charging apparatus of claim 1, wherein each current limiting means further comprises a visual indicator of the charge level of the connected battery.

6. The battery charging apparatus of claim 1, wherein the current emitted by the power supply decreases as the battery connected thereto approaches a full charge condition and repels the current emitted by the power supply.

7. The battery charging apparatus of claim 1, wherein the first and second batteries are connected to function as a single power source with the first battery charged by the first power source and isolated from the second power source as it charges the second battery.

8. Apparatus for continuous simultaneous charging and thereafter maintaining the charge of a plurality of plate-type batteries, each having a known theoretical voltage, a positive terminal, and a negative terminal, comprising:
    a first power supply having an alternating current output;
    a first circuit loop connecting the first power supply to a first battery to be charged wherein the first circuit loop comprises:
        a first diode connected in the first loop between the first power supply and the positive post of the first battery to be charged;
        a second diode connected in the first loop between the first power supply and the negative post of the first battery to be charged; and
        first current limiting means connected in the first loop to limit the maximum current flowing through the first loop to charge the first battery;
    a second power supply having an alternating current output;
    a second circuit loop connecting the second power supply to a second battery to be charged wherein the second 25 circuit loop comprises:
        a third diode connected in the second loop between the second power supply and the positive post of the second battery to be charged;
        a fourth diode connected in the second loop between the second power supply and the negative post of the second battery to be charged; and
        second current limiting means connected in the second loop to limit the maximum current flowing through the loop to charge the second battery; and
    a third circuit loop connecting the second power supply to a third battery to be charged wherein the third circuit loop comprises:
        a fifth diode connected in the third loop between the second power supply and the positive post of the third battery to be charged;

a sixth diode connected in the third loop between the second power supply and the negative post of the third battery to be charged; and third current limiting means connected in the third loop to limit the maximum current flowing through the loop to charge the third battery.

9. The battery charging apparatus of claim 8, wherein the first power supply comprises a transformer capable of emitting a flow of electricity having a voltage substantially equal to the theoretical voltage of the battery to be charged and an amperage substantially equal to the maximum amperage of the first current limiting means.

10. The battery charging apparatus of claim 8, wherein the second power supply comprises a transformer capable of emitting a flow of electricity having a voltage substantially equal to the theoretical voltage of the battery to be charged and an amperage substantially equal to two times the maximum amperage of the second or the third current limiting means.

11. The battery charging apparatus of claim 8, wherein each current limiting means further comprises a light bulb having a predetermined maximum amperage substantially equal to the maximum desired amperage for charging the battery.

12. The battery charging apparatus of claim 8, wherein each current limiting means further comprises a visual indicator of the charge level of the connected battery.

13. The battery charging apparatus of claim 8, wherein the current emitted by the power supply decreases as the battery connected thereto approaches a full charge condition and repels the current emitted by the power supply.

14. The battery charging apparatus of claim 8, wherein the first and second batteries are connected to function as a single power source with the first battery connected through the first loop to the first power source with the first loop being isolated from the second loop connecting the second battery to the second power source.

* * * * *

UNITED STATES PATENT AND TRADEMARK OFFICE
CERTIFICATE OF CORRECTION

PATENT NO. : 5,371,454

DATED : December 6, 1994

INVENTOR(S) : Albert Marek

It is certified that error appears in the above-identified patent and that said Letters Patent is hereby corrected as shown below:

Column 8, line 52 after "second" delete --25--.

Signed and Sealed this

Eleventh Day of April, 1995

Attest:

Attesting Officer

BRUCE LEHMAN

Commissioner of Patents and Trademarks